Oct. 13, 1942.  J. SCHAUB  2,298,903
APPARATUS AND METHOD FOR MAKING CHILLED PRODUCTS
Filed Oct. 21, 1940  4 Sheets-Sheet 1

INVENTOR.
JACOB SCHAUB, Deceased,
By BETTY A. SCHAUB, Executrix
ATTORNEY.

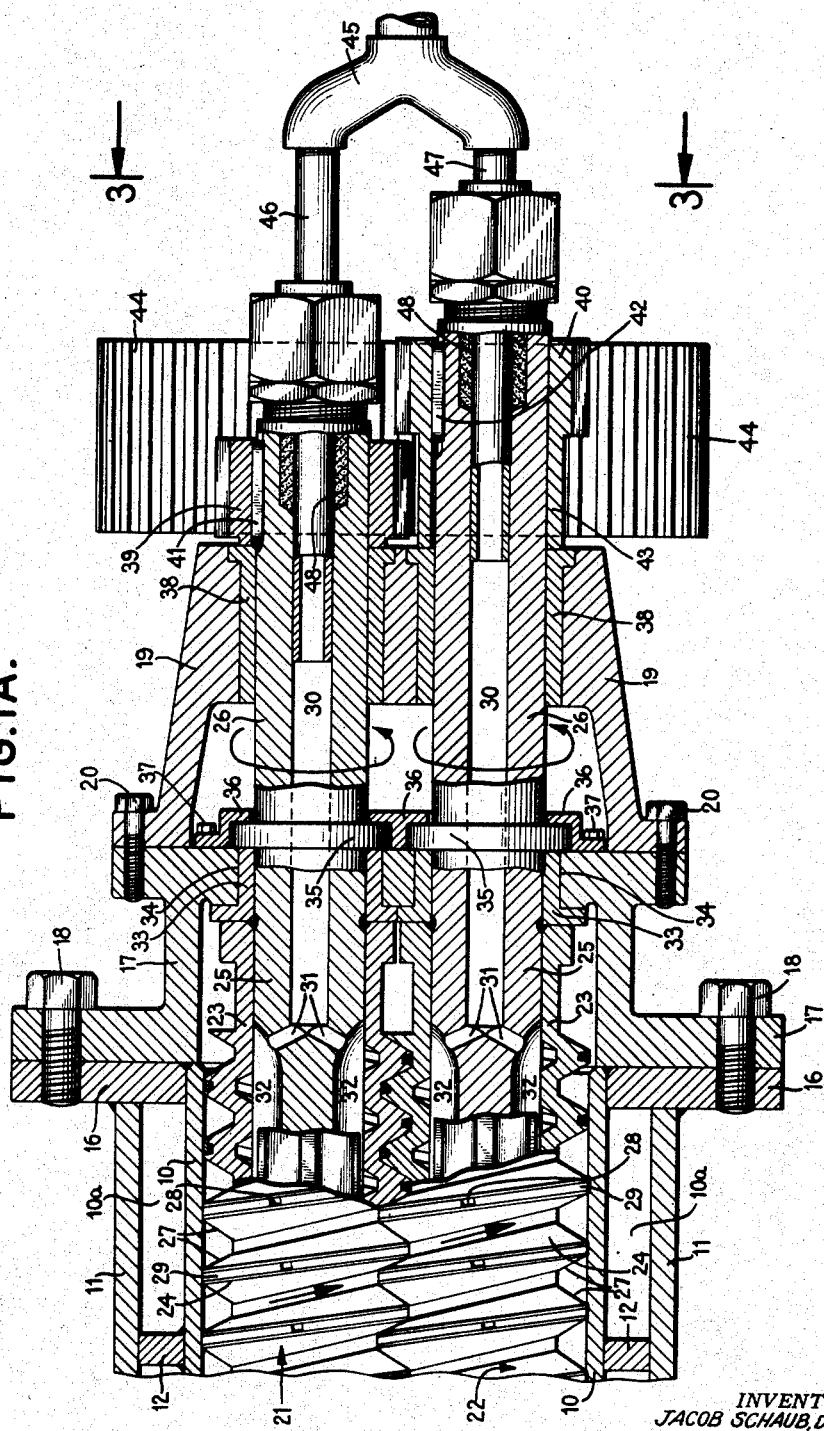

Oct. 13, 1942.  J. SCHAUB  2,298,903
APPARATUS AND METHOD FOR MAKING CHILLED PRODUCTS
Filed Oct. 21, 1940  4 Sheets-Sheet 3

INVENTOR.
JACOB SCHAUB, Deceased
By BETTY A. SCHAUB, Executrix
U. Philips Churchill
ATTORNEY.

Oct. 13, 1942.  J. SCHAUB  2,298,903
APPARATUS AND METHOD FOR MAKING CHILLED PRODUCTS
Filed Oct. 21, 1940  4 Sheets-Sheet 4
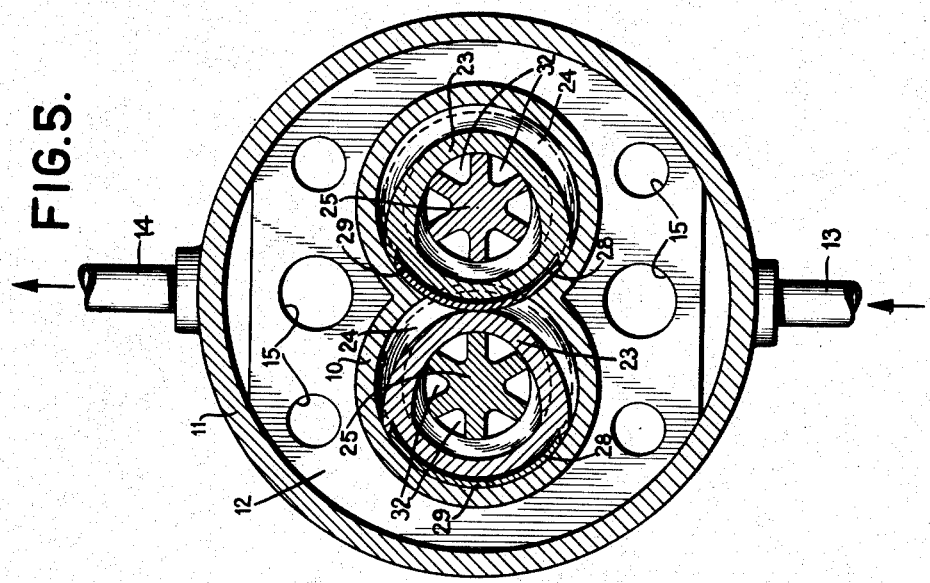
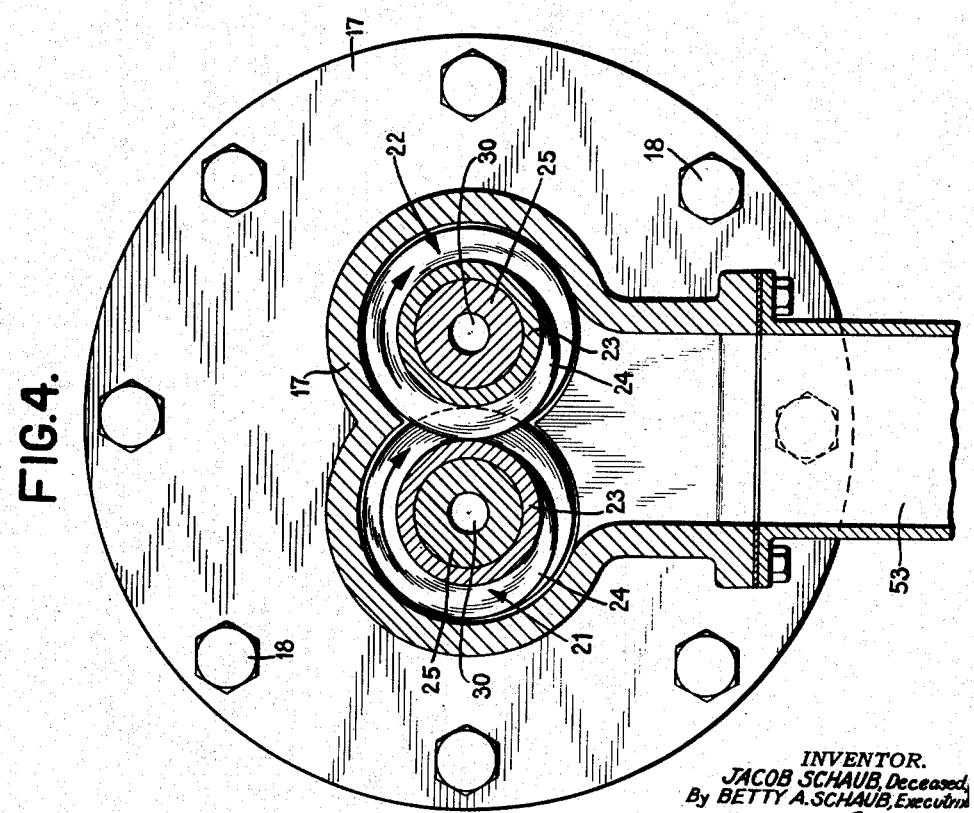
INVENTOR.
JACOB SCHAUB, Deceased,
By BETTY A. SCHAUB, Executrix
ATTORNEY.

Patented Oct. 13, 1942

2,298,903

UNITED STATES PATENT OFFICE 2,298,903

APPARATUS AND METHOD FOR MAKING CHILLED PRODUCTS

Jacob Schaub, deceased, late of Westfield, N. J., by Betty A. Schaub, executrix, Westfield, N. J., assignor to The Best Foods, Inc., a corporation of Delaware Application October 21, 1940, Serial No. 362,174

8 Claims. (Cl. 99—244)

This invention relates to a method and apparatus for chilling liquids to produce congealed products.

There has been a real demand for many years for a practical continuous process for producing chilled edible products such as margarine and shortening compounds. For example, the manufacture of margarine, as heretofore practiced, has involved chilling a thin layer of an oil and water emulsion, collecting the solidified crystals in a mass, and thereafter salting and working this material into a final product. To obtain a good texture, it has been considered necessary to carry out extensive working of the product and to allow batches of the material to stand without working for a suitable period of time between different working operations.

In accordance with this invention, it is possible to produce rapidly and continuously a very high quality of margarine, shortening compounds or similar materials.

One object of the invention is to provide a process and apparatus for simultaneously chilling and working or rubbing the liquid and semi-solid material obtained thereby to produce a finished edible product of high quality in a single operation.

A further object of the invention is to provide apparatus for achieving this result that is self-cleaning, does not become clogged by masses of solidified material, and that produces a more uniform working or rubbing action on the product as it congeals.

In order to understand the invention more clearly, reference may be had to the embodiment of the invention illustrated in the accompanying drawings, in which—

Figures 1 and 1A taken together illustrate a foreshortened horizontal sectional view through an apparatus for chilling and working liquids continuously to produce solid edible products.

Figure 1:
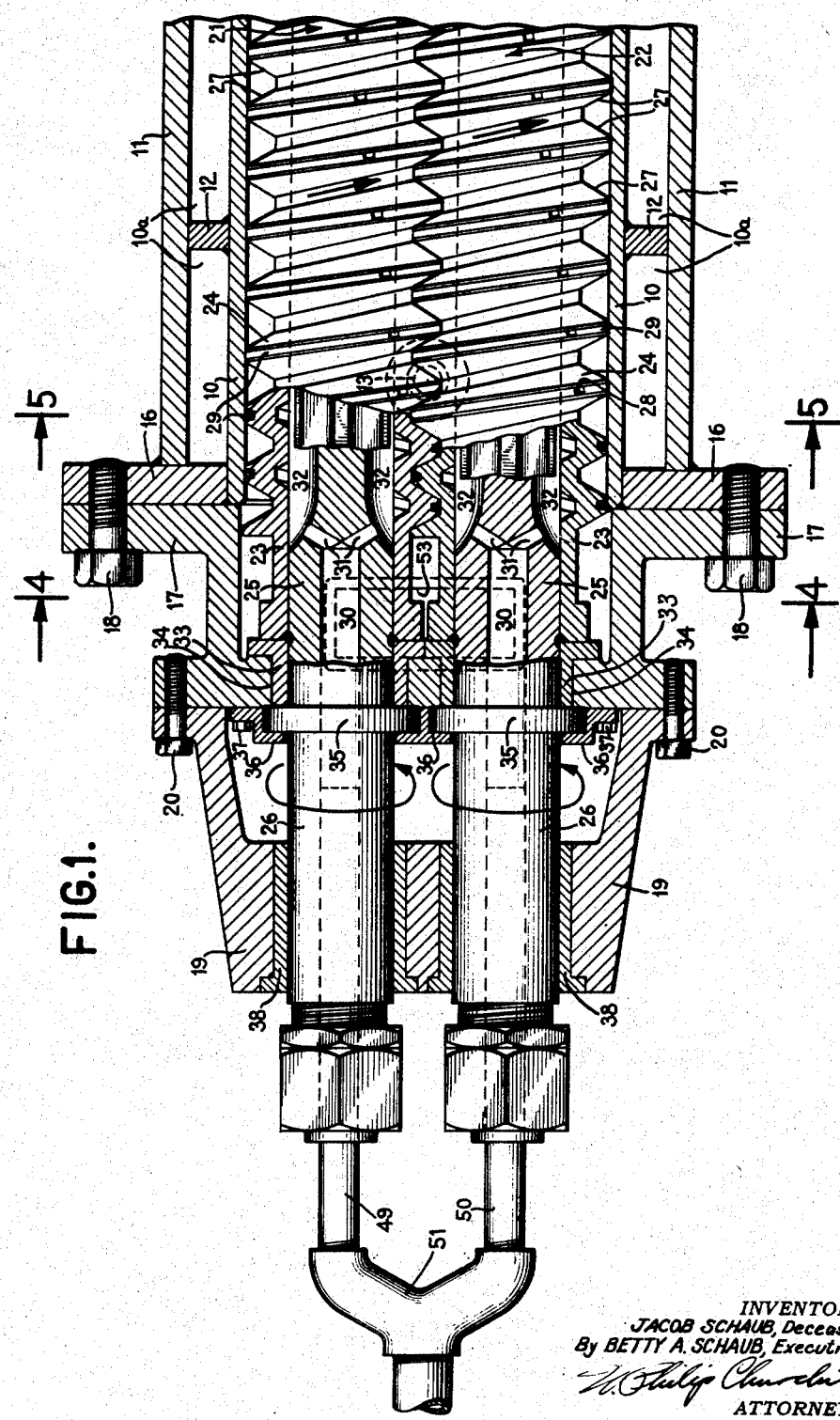
Figure 2:
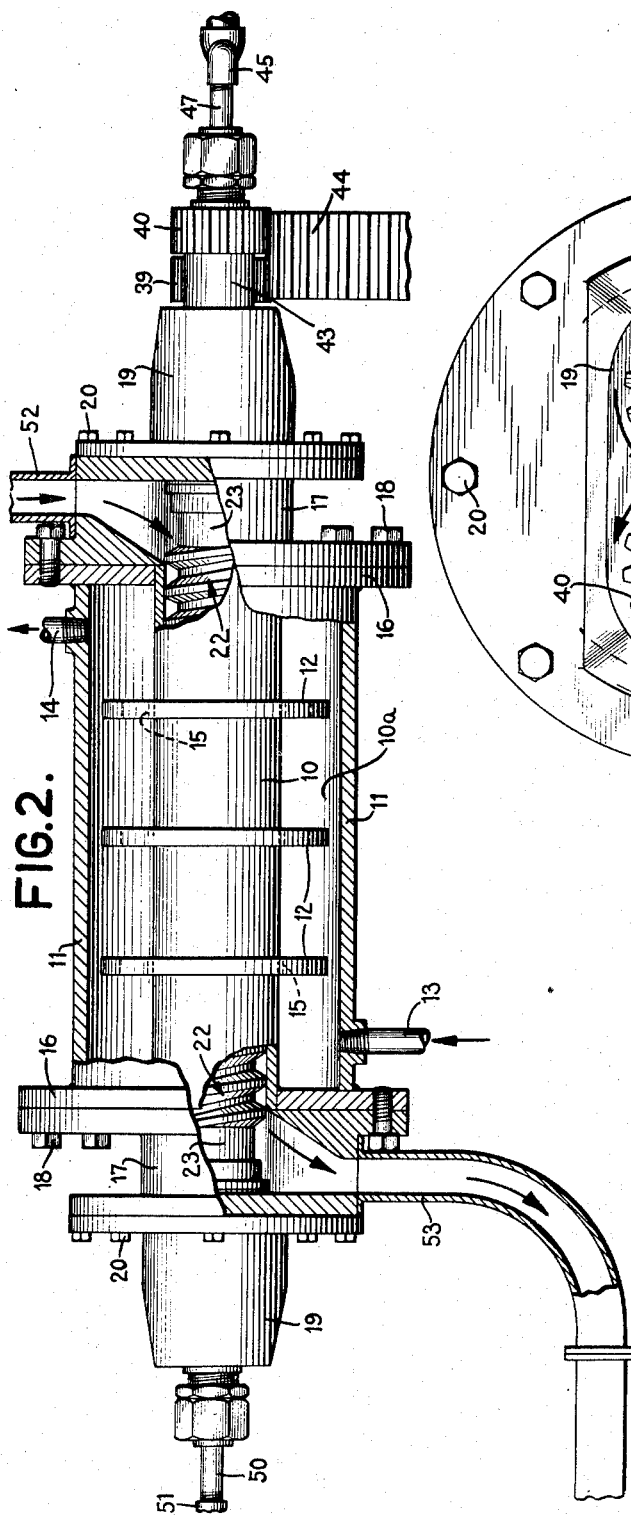
Figure 2 is a side elevation of such an apparatus on a smaller scale with portions thereof broken away.

Figures 4 and 5 are vertical sectional views taken on the lines 4—4 and 5—5, respectively, of Figure 1.

The embodiment of the apparatus shown in the drawings consists of a housing 10 in the shape of two parallel intersecting cylinders, the shape of which in cross section is shown in Figure 5. Surrounding this housing is an outer housing wall 11, which may be of generally cylindrical shape, and which is spaced from the inner housing 10 by means of plates 12 to provide a chamber 10a for the circulation of a suitable refrigerant. Three such plates 12 are illustrated, although any suitable number may, of course, be employed.

To allow for the circulation of the refrigerant, which is introduced into the space 10a through the pipe 13 and drawn off through the pipe 14, the plates 12 may be spaced at the top and bottom from the inner wall of housing 11 and have suitable perforations 15 therein. These plates may conveniently be welded to the inner housing 10 or secured in place by bolts or any other suitable means.

Surrounding each end of the inner housing 10, and providing end walls for the refrigerant chamber 10a, are a pair of annular plates 16, 16 welded or otherwise secured to the ends of housings 10 and 11. The annular end housing members 17, 17 may be secured to the plates 16, 16 by bolts 18 or other suitable means. The annular housing members 17, 17 provide, at the inlet and outlet ends of the machine, chambers of relatively small volume for the introduction and exit of material that is treated. Secured to the outer ends of the annular housing members 17, 17 are bearing housing members 19, 19 held in place by bolts 20 or other suitable means, for a purpose described below.

Within the housing 10, a pair of rotors 21, 22 are arranged for simultaneous rotation in the same direction. Each of these rotors is made up of a tubular member 23 provided externally with screw threads 24 and a central core member 25 that projects at each end to serve as shafts 26 for the rotor. The screw threads 24 are preferably formed with tapered or inclined walls such as shown at 27 and mesh with each other to permit rotation of the rotors simultaneously in the same direction. The outer edges of these screw threads 24 may have grooves 28 cut in them to receive and carry resilient scraper rings 29 for scraping chilled material continuously from the inner wall of the housing 10.

The core members 25 are attached to the tubular members 23 by welding or the like and may have central openings 30 in their end shaft portions 26 communicating through the small openings 31 with longitudinal grooves 32 milled out of the central portions of the core members. At each end of the apparatus, the shafts 26 may project through suitable bearings 33 pressed into the openings 34 in the housing members 17, 17. Collars 35, pressed, keyed or otherwise held on the shafts 26, bear against the outer surfaces of the housing members 17, 17 to hold the rotors against axial movement. Suitable sealing plates 36 may be secured to the ends of the housing members 17, 17 around these collars by means of bolts 37.

The ends of the shafts 26 may be arranged to rotate within bearings 38 pressed into openings in the outer housing members 19, 19. At one end of the apparatus, these shafts carry small spur gears 39 and 40, respectively, fixed thereto by means of the keys 41 and 42. The spur gear 39 may be arranged adjacent one end of the corresponding bearing 38, and the other spur gear 40 preferably has a rather long shank 43 extending at one end into contact with the other bearing 38. Thus the teeth of the two spur gears 39 and 40 are spaced axially from each other, but both are allowed to mesh simultaneously with the teeth of a rather wide driving gear 44.

Refrigerant in either gaseous or liquid form may be supplied to the hollow interior of the rotors 21 and 22 through the Y connection 45 and the pipes 46, 47. These pipes extend into the openings 30 in shafts 26 a suitable distance through stuffing or packing glands 48. Refrigerant may be drawn off from the interior of the rotors 21 and 22 through suitable pipes 49, 50 and a Y connection 51 of similar construction and arrangement at the other ends of the rotors.

Materials to be chilled, such as a liquid emulsion of oil and water suitable for making margarine, may be introduced into the space within the housing member 17 at one end of the apparatus through a suitable pipe 52. The chilled product may be withdrawn from the space within the other housing 17 at the outlet end of the apparatus through the pipe 53.

The operation of the apparatus will be described by way of example in connection with the manufacture of margarine, although it will be apparent that other chilled products can be prepared in a similar manner. An emulsion of a suitable oil and water containing salt and any other ingredients desired in the proportions needed in the final product, is fed into the inlet opening 52 by gravity or under pressure. The space within the housing member 17 at the inlet end of the apparatus is preferably restricted so that only a small quantity of the emulsion can accumulate therein before being picked up by the flights of the screw threads 24 on the rotors 21 and 22.

The emulsion entering the inlet 52 is preferably liquid but at a temperature closely approximating the melting point of the oil or fat employed. For example, if the fat or oil has a melting point of 96° F. the emulsion may be introduced into the apparatus in a liquid condition at a temperature of about 95-96° F. This provides quick chilling and hardening, and a maximum amount of working of the congealed material for the size of the apparatus. Care should be exercised however, not to have the temperature of the emulsion so low that grainy or sandy particles are formed because this may adversely affect the texture of the final product. The small amount of free or waste space within the inlet end housing 17 keeps the emulsion moving so that it does not harden in and choke up the inlet chamber.

The emulsion is picked up by the worm flights 24 and carried into the externally chilled housing 10. This housing may be cooled by a suitable refrigerant that is introduced into the space 10a between the housings 10 and 11 through pipe 13 near the outlet of the apparatus and drawn off through pipe 14 near the inlet of the apparatus. Refrigerant may also be circulated through the rotors 21 and 22 by means of the Y connection 45 and pipes 46, 47 at one end and the Y connection 51 and pipes 49, 50 at the other end of the apparatus. By reason of the fluid-tight connection of these pipes to the shaft portions 26 of the rotors, the rotors may be rotated freely around the ends of the pipes without substantial leakage of refrigerant. The refrigerant circulates through the rotors by passing through the openings 30 at one end, thence through the connecting openings 31 and along the grooves 32 to the openings 31 and 30 at the other end of the rotors.

Figure 3:
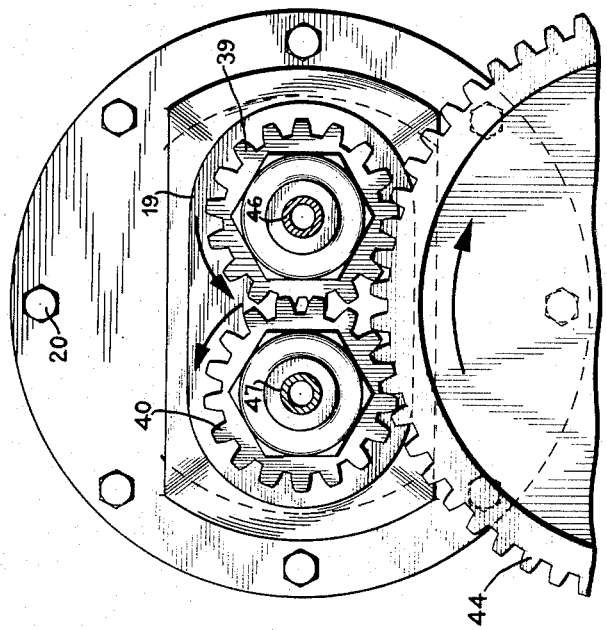
Figure 3 is an end elevation, partly in section, taken on the line 3—3 of Figure 1A.

The emulsion picked up by the rotors is thus quickly chilled below its melting point and is forced along inside the housing 10 toward the outlet 53. By rotating both rotors in the same direction (see Fig. 3), the surfaces of the rotor threads 24 at their points of contact are caused to move in opposite directions. Thus, the chilled material tends to be divided and builds up both above and below the points of contact of the rotor threads (see Figs. 4 and 5) instead of piling up on only one side as happens when the rotors are rotated in opposite directions. In addition, the thread surfaces in accordance with this invention, are moving in opposite directions as they strike each other and thus exert a distinct rubbing action on the material that squeezes through between these surfaces instead of a purely rolling action. This rubbing produces a smoother product and the division of the built up material above and below the rotor juncture line furnishes a far more efficient working of the material for a given size of apparatus.

The operation of the rotors is also simplified and improved mechanically by rotating them in the same direction. If the rotors are rotated in opposite directions with one rotor being driven by the other, an allowance must be made in the worm threads to take care of the fact that the first or directly driven rotor will start to turn before the slack is taken up and the second rotor driven therefrom starts to turn. With the rotors turning in the same direction, however, they may both be driven directly from a common gear or other driving means and there is less tendency for the threads 24 on the rotors to bind.

The chilled emulsion in a plastic condition is rubbed and forced along through the housing 10 and finally into the space within the outlet housing 17. During this working, the chilled material is continually scraped from the inner wall of the housing 10 by the scraper rings 29 which are resiliently pressed against the housing surface and exert a positive spiral cleaning or scraping action. The rubbing of the screw threads on rotor 21 against the screw threads of rotor 22 also produces a continual self cleaning of the rotor surfaces. As the finished margarine is continuously being forced into the outlet housing 17 under pressure, a continuous flow of the product out the outlet 53 is maintained. The material may be shaped as it leaves the apparatus, and may be cut immediately into blocks of suitable size, if desired.

While the invention has been described for the production of margarine, other edible chilled products such as shortening and the like may be prepared in a similar manner. Also, any suitable number of rotors may be used instead of the two shown, with appropriate revision of the shape of the housings. The construction of and shape of the rotors and screw threads illustrated is preferred, although it will be apparent to those skilled in the art that other shapes of screw threads and modification may be employed.

Subject matter disclosed but not claimed herein is claimed in the copending application of Gordon C. Schaub and Jacob Schaub, Serial No. 282,020, filed June 30, 1939.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for preparing congealed edible products comprising an elongated housing, a plurality of intermeshing rotors for forcing liquid and plastic material through said housing, means for rotating said rotors in the same direction, and means for chilling said material within said housing.

2. Apparatus for preparing congealed edible products comprising an elongated housing, a plurality of intermeshing rotors for forcing liquid and plastic material through said housing, a single direct driving element for rotating simultaneously each of said rotors in the same direction, and means for chilling said material within said housing.

3. Apparatus for preparing continuously a chilled fatty product comprising a pair of rotatable members having intermeshing helical protuberances thereon, an elongated housing fitting snugly around at least the central portions of said members, means for chilling said housing, means for rotating said members so that surfaces thereof in contact with each other are moved in opposite directions, means for introducing material to be chilled at one end of said housing, and means for withdrawing the chilled product from the other end thereof.

4. Apparatus for preparing continuously a congealed edible product comprising an elongated housing, a plurality of rotors in said housing constructed to rotate in the same direction in contact with each other and to force a plastic material along and through said housing, means for introducing material to be congealed into one end of said housing, means for withdrawing congealed product from the other end of the housing, means for chilling the material during passage through the housing, and means for rotating said rotors in the same direction.

5. Apparatus as defined in claim 4 in which the chilling means comprises means for circulating a refrigerant through the rotors and around the exterior of the housing.

6. Apparatus for preparing congealed edible products comprising an elongated housing, a pair of rotors having intermeshing helical threads thereon arranged for rotation within said housing, said rotors being self-cleaning and adapted to scrape congealed material from the inner surface of the housing, means for chilling material as it passes through the housing, and a single driving gear meshing directly with gears on the shafts of said rotors.

7. A method of preparing a congealed edible product comprising flowing a liquid fatty material at a temperature just above its melting point into a chilling chamber, forcing said material while chilling the same through said chamber and subjecting the liquid and solidified material to the working and rubbing action of a plurality of members rotated in the same direction in said chamber in contact with each other whereby the material is subjected to a rubbing and shearing action and is distributed substantially uniformly on each side of the line of contact of said members, and collecting the congealed product as it emerges from said chamber.

8. A method of preparing margarine continuously comprising flowing a liquid fat and water emulsion into an elongated chamber, solidifying said emulsion therein by chilling, subjecting the liquid and solidified emulsion in the chamber to the working and rubbing action of a plurality of rotors rotated in contact with each other in the same direction whereby the emulsion is subjected to a rubbing and shearing action and is distributed substantially uniformly on each side of the line of contact of said members, forcing said material through said chamber as it is worked, and collecting the margarine as it emerges from the chamber.

BETTY A. SCHAUB.
*Executrix of the Last Will and Testament of Jacob Schaub, Deceased.*